United States Patent [19]

Malone

[11] Patent Number: 5,802,732

[45] Date of Patent: Sep. 8, 1998

[54] TAPE MEASURE WITH AUDIO RECORDER

[76] Inventor: Robert D. Malone, 14727 Bothell Way NE., Suite 1, Seattle, Wash. 98155

[21] Appl. No.: 585,830

[22] Filed: Jan. 16, 1996

[51] Int. Cl.⁶ .................................................... G01B 3/10
[52] U.S. Cl. .............................................. 33/768; 33/761
[58] Field of Search ............................ 33/755, 760, 761, 33/763, 764, 767, 768, 769, 770

[56] References Cited

U.S. PATENT DOCUMENTS

| | | | |
|---|---|---|---|
| 3,514,863 | 6/1970 | Moll | 33/764 |
| 3,672,597 | 6/1972 | Williamson | 33/761 |
| 3,838,520 | 10/1974 | Quenot | 33/760 |
| 3,862,761 | 1/1975 | Conley | 33/761 |
| 4,747,215 | 5/1988 | Waikas | 33/763 |
| 4,766,673 | 8/1988 | Bolson | 33/760 |
| 4,972,600 | 11/1990 | Nosek | 33/769 |
| 5,230,159 | 7/1993 | Lipsey | 33/770 |
| 5,379,524 | 1/1995 | Dawson | 33/770 |
| 5,396,578 | 3/1995 | Howes | 33/760 |
| 5,433,014 | 7/1995 | Falk et al. | 33/763 |

FOREIGN PATENT DOCUMENTS

| | | | |
|---|---|---|---|
| 1547479 | 11/1968 | France | 33/761 |
| 2614982 | 11/1988 | France | 33/763 |

*Primary Examiner*—G. Bradley Bennett
*Attorney, Agent, or Firm*—David L. Garrison; Garrison & Associates PS

[57] ABSTRACT

A combination measuring instrument such as an elongated and retractable tape measuring device is associated with an audio recording apparatus which enables a user to record measurements observed on the tape measure device simultaneously with the act of performing the measurement and which permits the subsequent playback of the recorded information for use in a later discrete step of manufacturing or utilizing the recorded information. The recording device may be positioned in or on the housing of the measuring device so that the user may conveniently record the observed measurement orally for later reuse.

6 Claims, 1 Drawing Sheet

5,802,732

TAPE MEASURE WITH AUDIO RECORDER

BACKGROUND ART

This application relates to a combination measuring instrument such as an elongated and retractable tape measuring device associated with an audio recording apparatus which enables one to record measurements observed on the tape measure device simultaneously with the act of performing the measurement and which permits the subsequent playback of the recorded information for use in a later discrete step of manufacturing or utilizing the recorded information. The recording device may be coupled automatically with the measuring device or may be positioned adjacent to the location at which the measurement is taken so that the user may conveniently record the observed measurement orally for later reuse.

DISCLOSURE OF INVENTION

My invention is disclosed in a disclosure document filed with the United States Patent and Trademark Office dated Dec. 27, 1995, entitled TALKING POWER MEASURING TAPE, the disclosure therein being incorporated herein by reference.

This invention contemplates an extendable and retractable tape measure device associated with an audio recording circuitry for the purpose of recording measurements taken or observed on the tape in which the recording device is conveniently operable by the user by accessing control means at one side or edge of the housing enclosing or storing the tape device. The tape may be a spring loaded retractable type or may be the manually operated version well known in the art in which a high capacity reel holds an elongated tape for use by surveyors and the like. The automatically retractable device known to carpenters, steamfitters and other arts, as well as the home do-it-yourself users is enhanced in its usefulness by the concepts of this invention. The combination of an extendable and retractable measuring tape with audio recorder permits the user to record measurements from any type of project, such as encountered by carpenters, carpet layers, brick masons, construction engineers and workers and the like without the need for traditional paper records or frequently faulty memories. The invention comprises the provision of an audio recording microcircuitry and controls associated with a tape measure housing, the recording mechanism of which may be integrally formed and positioned within the housing or may be detachable for other uses. The tape may be of any length, such as that usually encountered in the metal tape versions found in hardware stores and the like, or may advantageously be the fabric or metal versions of greater length frequently used by surveyors.

BEST MODE FOR CARRYING OUT THE INVENTION

Figure 1:
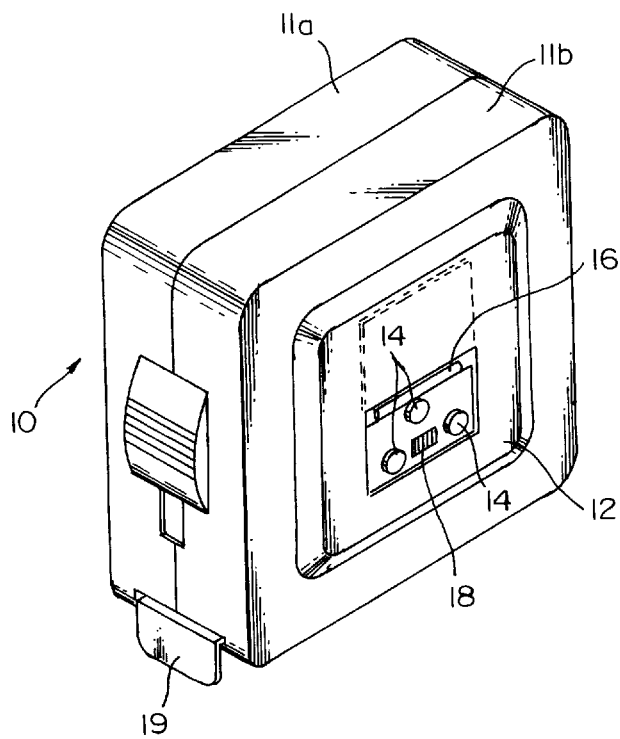
FIG. 1 shows a perspective view of a retractable and extendable tape measure with integrally mounted audio recording mechanism having controls accessible at one side thereof.

Referring specifically to the drawings, there is seen in FIG. 1 an extendable and retractable tape measure 10 much like those sold widely in hardware and lumber stores, which is widely available and useful to carpenters, other professionals, as well as home do-it-yourself enthusiasts. A two-piece housing 11a and 11b enclose the tape, the end thereof protruding through the housing at hook 19. A microcircuit having capacity to record an audio message of limited duration, such as for example, less than about five minutes and preferably about one minute, is located in space otherwise unoccupied within the housing of the tape, or may be as shown, positioned in a slightly enlarged portion 12 of the housing usually provided for the tape. Controls 14 are accessible through the sliding door 16, which may be urged into the closed position by a spring mechanism, (not shown). Use of the controls in combination with microphone/speaker 18 provides for recording a message, playback of the message and erasing the message in preparation for reuse. Alternatively, or in addition to the foregoing, the microcircuit may provide for substantial storage of data which may be downloaded to computers and other electronic devices as desired.

Figure 2:
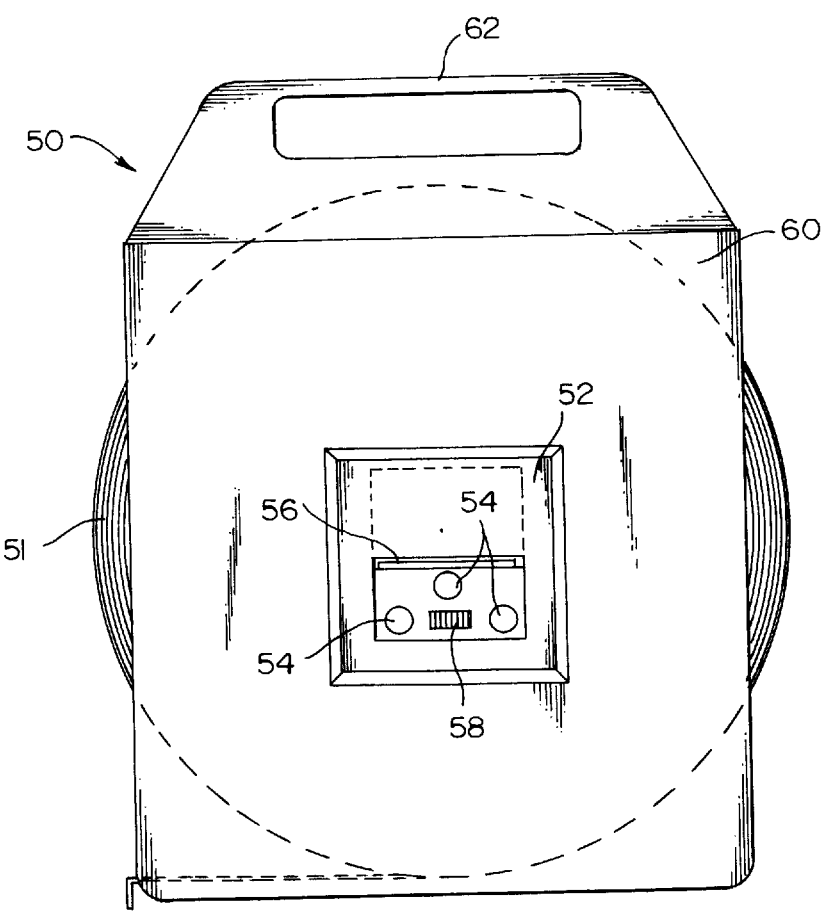
FIG. 2 shows a surveyor's type of measuring device with side accessible audio recording means.

FIG. 2 shows an extendable and retractable tape measure 50 having a large capacity spool of measuring tape 51, such as is widely used by surveyors, building construction workers and the like. A frame or housing 60 having handle 62 is provided to store the tape 51. Hook 59 fastened to the end of tape 51 may be used to engage a structure to be measured. A microcircuit having capacity to record an audio message of limited duration, such as for example, less than about five minutes and preferably about one minute, is located on one side of the housing of the tape, positioned in a slightly enlarged portion 52 of the housing usually provided for the tape. Controls 54 are accessible through the sliding door, which may be urged into the closed position by a spring mechanism, (not shown). Use of the controls 14 in combination with microphone/speaker 18 provides for recording a message, playback of the message and erasing the message in preparation for reuse. The microcircuit may also provide for substantial storage of data which may be downloaded to a computer or other electronic devices as desired.

INDUSTRIAL APPLICABILITY

This invention is useful in the measurement and simultaneous audio recording of measurements by workers such as surveyors, building construction workers carpenters and other manual trades, as well as by home do-it-yourself enthusiasts to measure and record the dimensions of any project.

What is claimed:

1. A combination measuring tape and audio recorder comprising:
   a housing for a measuring tape;
   an elongated extendable and retractable measuring tape positioned in said housing;
   a microcircuit for recording audio messages of dimensions observed on said tape, said microcircuit positioned in a removable housing detachable from said tape; and
   control means for controlling said recording means to record, play back and erase messages thereon, said controls being positioned at one side of said housing accessible to the user.

2. The apparatus of claim 1 wherein said removable housing is attached to said tape housing with hook and loop fasteners.

3. A combination measuring tape and audio recorder comprising:
   a housing for a measuring tape;

an elongated extendable and retractable measuring tape positioned in said housing;

a microcircuit for recording audio messages of dimensions observed on said tape; and control means for controlling said recording means to record, play back and erase messages thereon, said controls being positioned at one side of said housing accessible to the user, said controls protected by a moveable sliding cover.

4. The apparatus of claim 3 wherein said movable cover is urged into the close position by a spring.

5. A combination measuring tape and audio recorder comprising:

a housing for a measuring tape;

an elongated extendable and retractable measuring tape positioned in said housing;

a microcircuit for recording audio messages of dimensions observed on said tape, said microcircuit including provision for storage of information and positioned in a removable housing detachable from said tape;

control means for controlling said recording means to record, play back and erase messages thereon, said controls being positioned at one side of said housing accessible to the user; and a movable sliding cover protecting said controls when said cover is in a closed position.

6. The apparatus of claim 5 further including a spring biasing means urging said cover into a closed position.

* * * * *